United States Patent
Narita et al.

(10) Patent No.: US 9,951,660 B2
(45) Date of Patent: Apr. 24, 2018

(54) VALVE TIMING CONTROL DEVICE FOR INTERNAL COMBUSTION ENGINE, AND FASTENING STRUCTURE

(71) Applicant: HITACHI AUTOMOTIVE SYSTEMS, LTD., Hitachinaka-shi, Ibaraki (JP)

(72) Inventors: Seijiro Narita, Ayase (JP); Kotaro Watanabe, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 108 days.

(21) Appl. No.: 14/917,706

(22) PCT Filed: Sep. 18, 2014

(86) PCT No.: PCT/JP2014/074654
§ 371 (c)(1),
(2) Date: Mar. 9, 2016

(87) PCT Pub. No.: WO2015/041280
PCT Pub. Date: Mar. 26, 2015

(65) Prior Publication Data
US 2016/0222835 A1  Aug. 4, 2016

(30) Foreign Application Priority Data

Sep. 20, 2013  (JP) .................................. 2013-195043

(51) Int. Cl.
*F01L 1/34* (2006.01)
*B21D 39/06* (2006.01)
(Continued)

(52) U.S. Cl.
CPC ................ *F01L 1/34* (2013.01); *B21D 39/06* (2013.01); *B23P 11/005* (2013.01);
(Continued)

(58) Field of Classification Search
CPC . F01L 1/34; F01L 1/3442; F01L 2001/34453; F01L 2001/34483
(Continued)

(56) References Cited

U.S. PATENT DOCUMENTS 8,127,728 B2 * 3/2012 Fischer ................. F01L 1/3442
123/90.17
2005/0183682 A1  8/2005 Uozaki et al.
2005/0252468 A1  11/2005 Tanaka et al.

FOREIGN PATENT DOCUMENTS

JP  48-039850 A  6/1973
JP  56-102326 A  8/1981
(Continued)

*Primary Examiner* — Ching Chang
(74) *Attorney, Agent, or Firm* — Foley & Lardner LLP

(57) ABSTRACT

A front plate 26 that covers a front end of a housing body is formed from a disk-shaped plate member 41 having in a middle thereof a fitting hole 41*a* and a cylindrical member 42 having at inner end part thereof a reduced diameter stepped-shaped fitting portion 42*a* that is fitted to the fitting hole 41*a*. Stopper portions 44 are formed by crimping a top end side of the fitting portion 42*a* fitted to the fitting hole 41*a*, and both of the plate member 41 and the cylindrical member 42 are connected and fixed together by the stopper portions 44 engaging with stopper grooves 43 that are formed at an inner end side hole edge of the fitting hole 41*a* in a pressed state.

18 Claims, 10 Drawing Sheets

(51) Int. Cl.
*B23P 11/00* (2006.01)
*F01L 1/344* (2006.01)

(52) U.S. Cl.
CPC ..... *F01L 1/3442* (2013.01); *F01L 2001/3443* (2013.01); *F01L 2001/34453* (2013.01); *F01L 2001/34469* (2013.01); *F01L 2001/34483* (2013.01); *F01L 2103/00* (2013.01)

(58) Field of Classification Search
USPC .......................................... 123/90.15, 90.17
See application file for complete search history.

(56) References Cited

FOREIGN PATENT DOCUMENTS

| | | |
|---|---|---|
| JP | 07-042721 A | 2/1995 |
| JP | 2001-098909 A | 4/2001 |
| JP | 2005-240651 A | 9/2005 |
| JP | 2005-325749 A | 11/2005 |
| JP | 2005-325758 A | 11/2005 |

\* cited by examiner

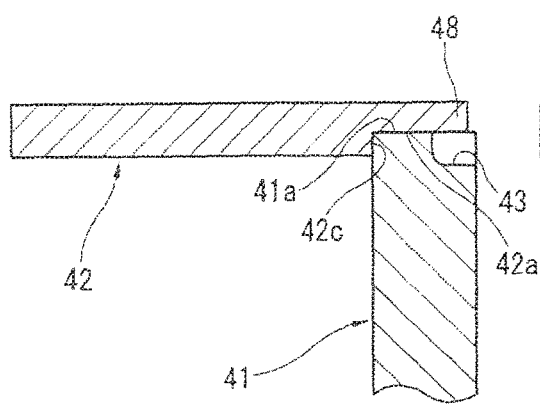
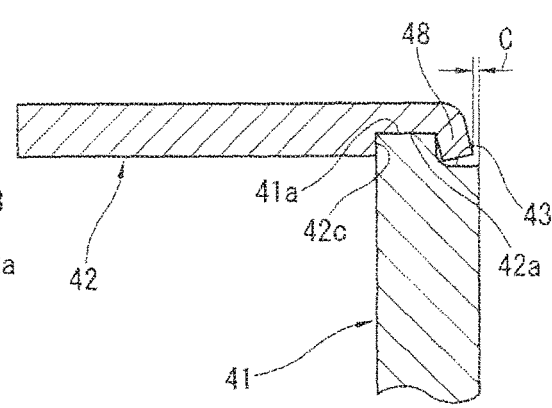

VALVE TIMING CONTROL DEVICE FOR INTERNAL COMBUSTION ENGINE, AND FASTENING STRUCTURE

TECHNICAL FIELD

The present invention relates to a valve timing control device etc. of an internal combustion engine, which variably controls open and closure timing of an intake valve and/or an exhaust valve of the internal combustion engine in accordance with an engine operating condition.

BACKGROUND ART

As a related art valve timing control device, for instance, it has been disclosed in and known by the following patent document 1.

In this valve timing control device, a torsion spring is installed between a housing and a vane rotor, and an urging force of the torsion spring can counter a reaction force of a valve spring (which is a force attempting to delay a rotation phase of a camshaft) generated upon driving of open and closure of a valve, thereby improving performance and response of the valve timing control device.

CITATION LIST

Patent Document

Patent Document 1: Japanese Unexamined Patent Publication No. JP2005-325749

SUMMARY OF THE INVENTION

Technical Problem

In the related art valve timing control device, in order to reduce a manufacturing cost, a plate member that covers a front end of the housing and a front plate as a cover member formed from a cylindrical member that accommodates therein the torsion spring are normally formed integrally with each other by pressing.

However, in the case where the front plate is formed as an integral component with the plate member by the pressing, as a problem, it is hard to secure adequate precision of the plate member of which high precision is required due to a relationship of a clearance with the vane rotor.

The present invention was made in view of the above technical problem arising in the related art valve timing control device. An object of the present invention is therefore to provide a valve timing control device etc. of the internal combustion engine, which is capable of easily securing the adequate precision measurements of the plate member that covers one end side of the housing.

Solution to Problem

In the present invention, a valve timing control device of an internal combustion engine comprises: a drive rotary member to which a turning force is transmitted from an engine crankshaft; a driven rotary member rotatably provided relative to the drive rotary member within a predetermined angle range; and a front plate with which one end of a torsion coil spring that forces the driven rotary member to one side of a rotation direction is engaged. And, the front plate has: a plate member provided so as to cover one end of the drive rotary member and having a circular hole penetrating a middle of the plate member; and a cylindrical member provided so as to protrude from an outer side surface of the plate member and fixed to the plate member.

As a manner of fixing the plate member and the cylindrical member, it is preferable that a key groove be formed at an inner end edge of the circular hole of the plate member, and the cylindrical member be connected and fixed to the plate member by inserting and fitting one end portion of the cylindrical member to the circular hole of the plate member and press-deforming a key forming portion that is formed at an end edge of the one end portion of the cylindrical member so that the key forming portion is engaged with the key groove of the plate member.

This fastening structure can be applied not only to a fastening structure in the valve timing control device of the internal combustion engine, but also to any structure in which two members of a plate member and a cylindrical member are fixed or fastened.

Effects of Invention

According to the present invention, since the front plate is formed by two members of the plate member and the cylindrical member, it is possible to easily secure the adequate precision measurements of the plate member.

BRIEF DESCRIPTION OF THE DRAWINGS

FIG. 5A shows a state before connection. FIG. 5B shows a state after the connection.

FIG. 6A shows a state before connection. FIG. 6B shows a state after the connection.

FIG. 7A shows a state before connection. FIG. 7B shows a state after the connection.

FIGS. 8A and 8B are enlarged longitudinal cross sectional views of a connecting part of the plate member and the cylindrical member shown in FIGS. 7A and 7B. FIG. 8A shows a state before connection. FIG. 8B shows a state after the connection.

FIG. 9A shows a state before connection. FIG. 9B shows a state after the connection.

EMBODIMENTS FOR CARRYING OUT THE INVENTION

Embodiments of a valve timing control device of an internal combustion engine according to the present invention will be explained with reference to the drawings. Each embodiment shows that the valve timing control device is applied to a variable valve system for an exhaust valve side of the internal combustion engine.

First Embodiment

Figure 1:
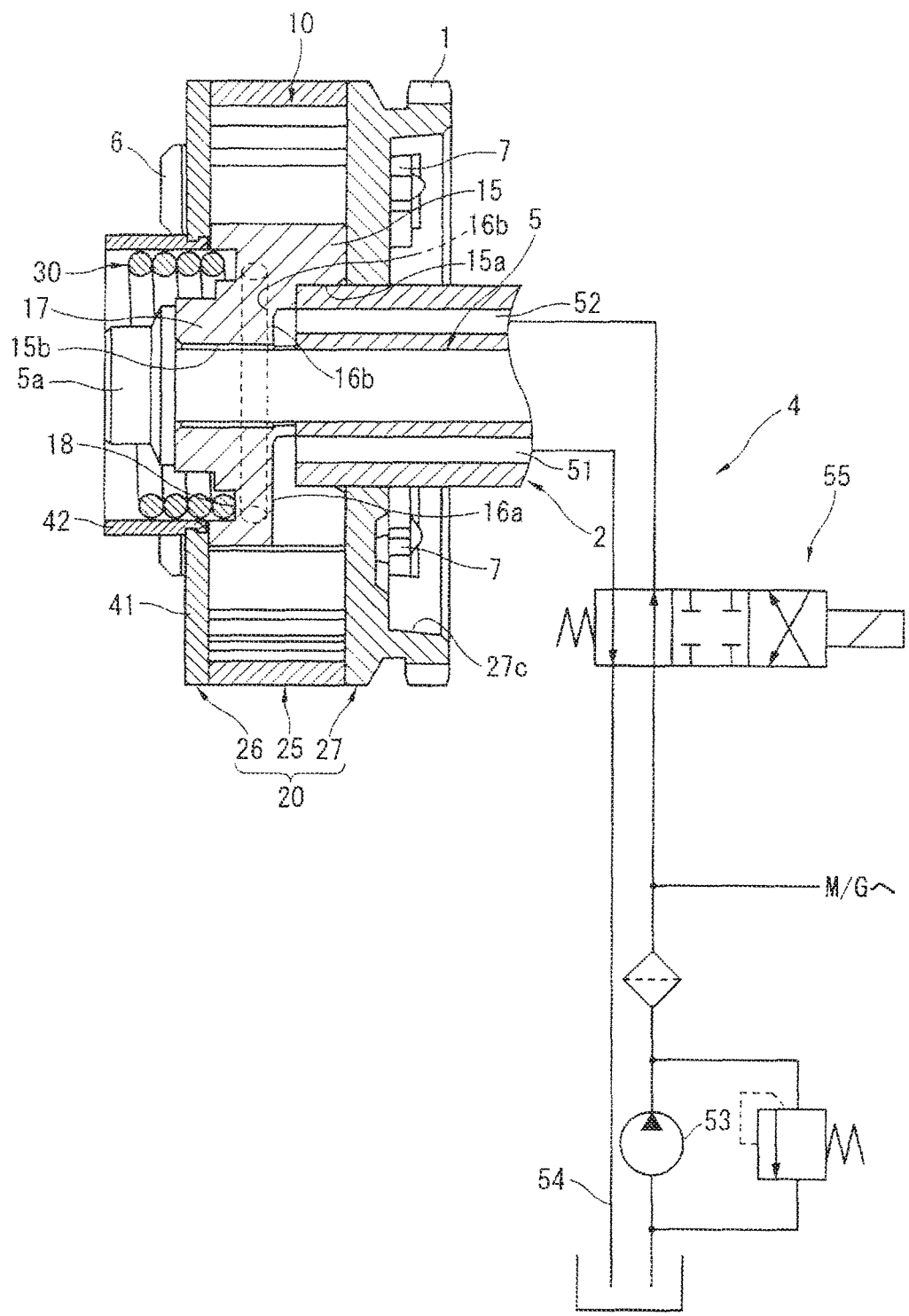
FIG. 1 is a longitudinal cross section of a valve timing control device of an internal combustion engine and a hydraulic circuit for the valve timing control device according to the present invention.

FIGS. 1 to 6A and 6B show a first embodiment of the valve timing control device of the internal combustion engine of the present invention. As shown in FIG. 1, the valve timing control device is a device that is installed between a sprocket 1 driven and rotated by a turning force of an engine crankshaft (not shown) and a camshaft 2 capable of rotating relative to the sprocket 1, and changes or controls a relative rotational phase between the both sprocket 1 and camshaft 2 by an operating control through a predetermined hydraulic pressure supply and exhaust unit 4.

Figure 2:
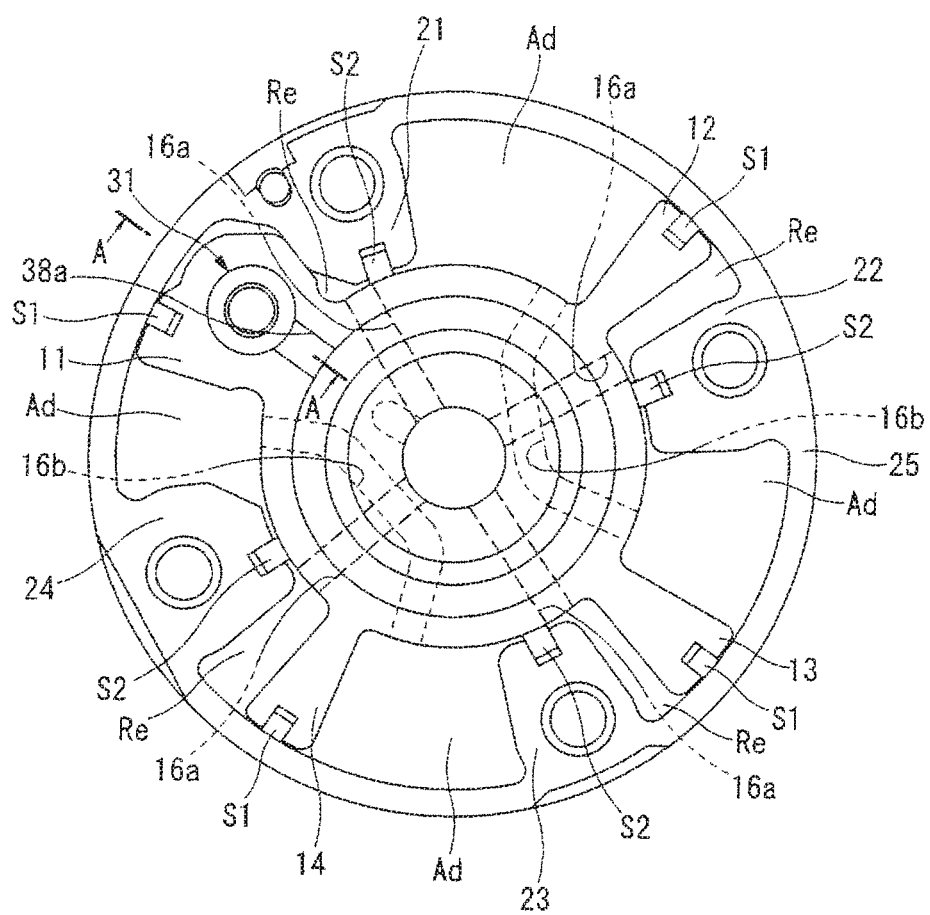
FIG. 2 is a front view of the valve timing control device shown in FIG. 1, with a front plate removed.

More specifically, as shown in FIGS. 1 and 2, the valve timing control device is formed mainly from a vane rotor 10, having an almost cylindrical rotor body 15 that is fixedly connected to one end portion of the camshaft 2 so as to rotate integrally with the camshaft 2 and a plurality of vanes 11 to 14 (four vanes in this embodiment) that are provided at and protrude from an outer peripheral portion of the rotor body 15, and a housing 20 formed integrally with the sprocket 1 and disposed on an outer peripheral side of the vane rotor 10 so as to accommodate therein the vane rotor 10 and so as to be able to rotate relative to the vane rotor 10 and having a plurality of shoes 21 to 24, corresponding to the vanes 11 to 14, that are provided at and protrude from an inner peripheral side of the housing 20. The operating control of the valve timing control device is done by selectively supplying a hydraulic pressure to a retard hydraulic chamber Re or an advance hydraulic chamber Ad, which are a pair of hydraulic chambers, defined between the vanes 11 to 14 and the shoes 21 to 24 by the hydraulic pressure supply and exhaust unit 4.

Figure 3:
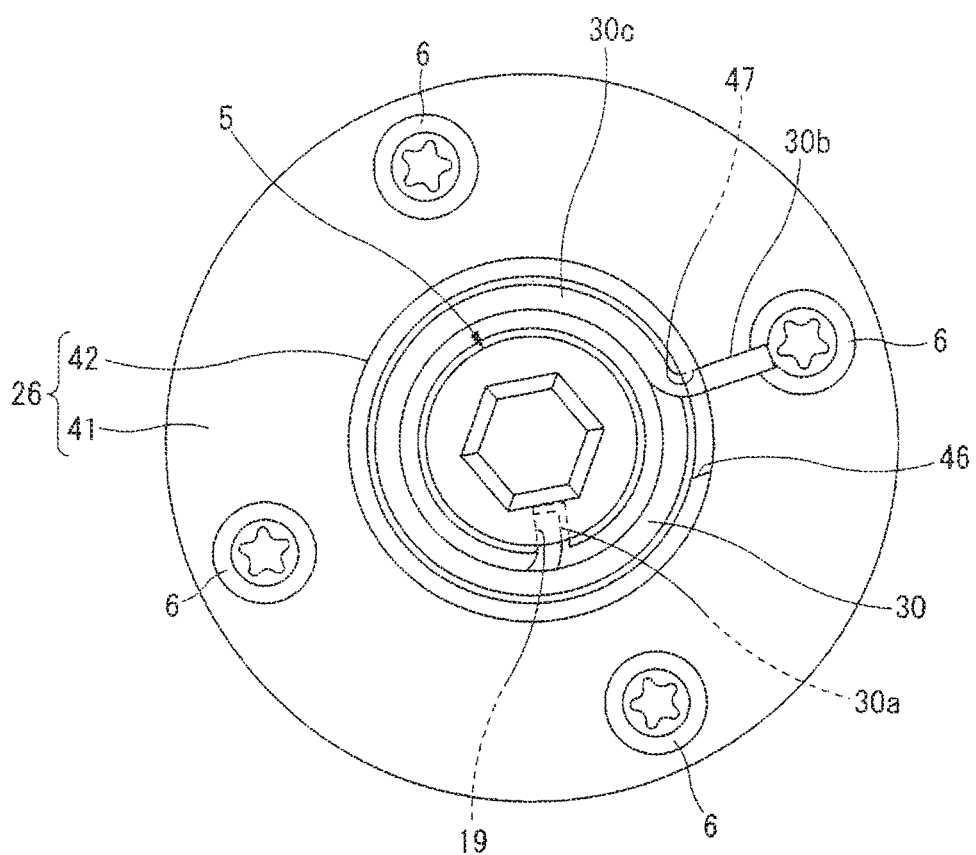
FIG. 3 is a front view of the valve timing control device shown in FIG. 1.

Further, as shown in FIGS. 1 and 3, a torsion spring 30 that forces the vane rotor 10 to an advanced angle side is set between the vane rotor 10 and the housing 20 with one end portion 30a of the torsion spring 30 fixed to the vane rotor 10 and the other end portion of the torsion spring 30 fixed to the housing 20. In a state immediately before an engine stop in which no hydraulic pressure is applied to both of the retard hydraulic chamber Re and the advance hydraulic chamber Ad, the torsion spring 30 forces the vane rotor 10 to the advanced angle side by an urging force of the torsion spring 30 against so-called alternating torque that corresponds to a rotation force in a retarded angle direction transmitted through the camshaft 2.

The vane rotor 10 is fitted onto the one end portion of the camshaft 2 through a fitting portion 15a that is recessed toward an inside (that is a side facing to the camshaft 2) of the rotor body 15, and connected to the camshaft 2 with a cam bolt 5 inserted into an insertion hole 15b that penetrates the middle of the fitting portion 15a, then the vane rotor 10 can rotate integrally with the camshaft 2. With this structure, by the fact that the vane rotor 10 rotating in synchronization with the camshaft 2 rotates relative to the housing 20 rotating in synchronization with an engine crankshaft, a rotation phase of the camshaft 2 relative to the engine crankshaft is changed, then an open/closure timing of the exhaust valve is changed.

Here, as shown in FIGS. 1 and 2, a plurality of retard side communication grooves 16a that connect an after-mentioned retard side oil passage 51 formed inside the camshaft 2 and the retard hydraulic chamber Re are formed radially by cutting in circumferential direction positions adjacent to respective base end portions of the vanes 11 to 14 on an inner side surface of the rotor body 15. A working fluid is then supplied to each retard hydraulic chamber Re through the inside of the camshaft 2 by the hydraulic pressure supply and exhaust unit 4.

Further, a plurality of advance side communication grooves 16b that connect an after-mentioned advance side oil passage 52 formed inside the camshaft 2 and the advance hydraulic chamber Ad are formed inside the rotor body 15. The working fluid is then supplied to each advance hydraulic chamber Ad through the inside of the camshaft 2 by the hydraulic pressure supply and exhaust unit 4.

In addition, as shown in FIGS. 1 and 3, a flat bolt seating portion 17 on which the cam bolt 5 (a head of the cam bolt 5) is seated is formed at a circumferential area of the insertion hole 15b at an outer end portion (that is an end portion facing to an after-mentioned front plate 26) of the rotor body 15. Also, a spring seating portion 18 that is a circular groove on which the one end portion 30a side of the torsion spring 30 is seated is recessed at a circumferential area of the bolt seating portion 17. The bolt seating portion 17 has an outside diameter that is slightly smaller than an inside diameter of a spring portion 30c that is a winding portion of the torsion spring 30, namely that the outside diameter of the bolt seating portion 17 is set to a size closer to the inside diameter of the spring portion 30c. The spring portion 30c is then f fitted onto an outer peripheral portion of the bolt seating portion 17.

Moreover, as shown in FIGS. 1 and 2, a first stopper portion 19 for stopper-fixing of the one end portion 30a of the torsion spring 30 is formed radially so as to open on an end surface of the bolt seating portion 17 by cutting. This first stopper portion 19 is formed so as to continue or extend to the spring seating portion 18 without a step, and penetrates the rotor body 15 so as to connect the spring seating portion 18 and the insertion hole 15b. The one end portion 30a side of the torsion spring 30 is bent from an outer peripheral side to a center side of the bolt seating portion 17, then fixed at the first stopper portion 19. A head 15a of the cam bolt 5 connecting to the camshaft 2 through the insertion hole 15b is placed so as to almost overlap and cover an axial direction opening of the first stopper portion 19, thereby avoiding falling-out of the one end portion 30a of the torsion spring 30 from the first stopper portion 19 (see FIG. 3).

As shown in FIGS. 1 and 2, each of the vanes 11 to 14 is provided, at a top end portion thereof, with a seal member S1 along a thickness direction of the vane (along an axial direction of the rotor body 15). Spaces between the vanes 11 to 14 and the shoes 21 to 24 are defined as the pair of retard and advance hydraulic chambers Re and Ad by the seal members 51 being in sliding contact with an inner peripheral surface of the housing 20. Here, only the predetermined vane 11 of the vanes 11 to 14 has a large circumferential direction width as compared with the other vanes 12 to 14. By the fact that the vane 11 contacts or is pressed against the shoe 21 or 24 which are adjacent to the vane 11 at a maximum relative rotation of the vane rotor 10, a further rotation of the vane rotor 10 is limited. Further, a locking mechanism 31 to hold the phase of the vane rotor 10 upon the engine stop is provided inside the wider vane 11.

Figure 4:
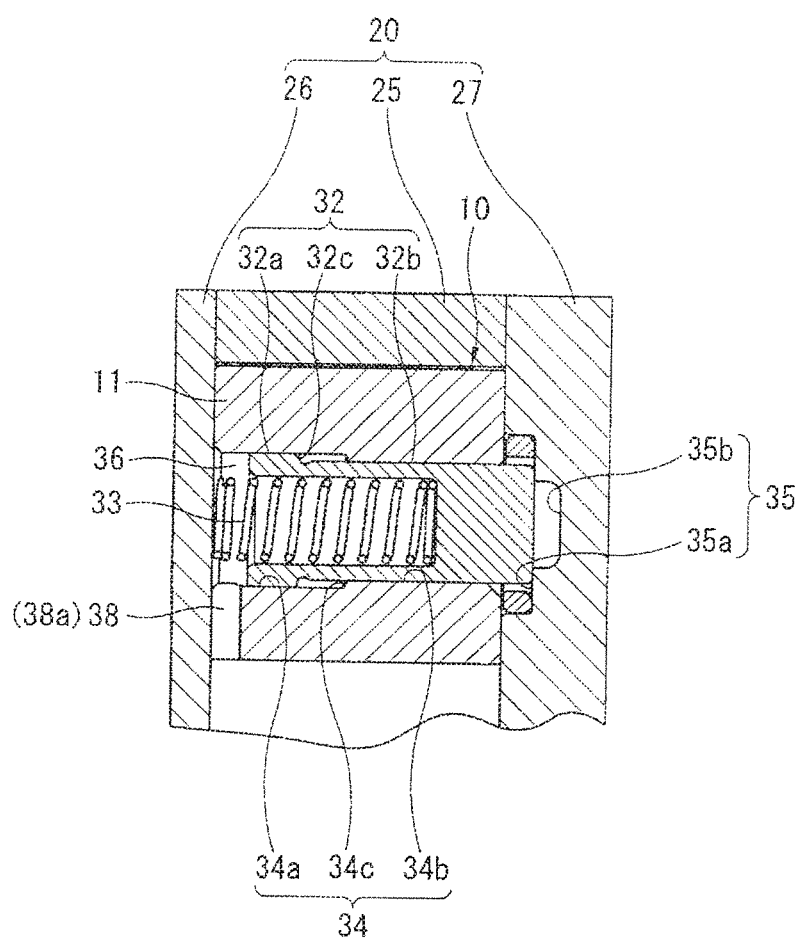
FIG. 4 is a sectional view taken along A-A line of FIG. 2.

This locking mechanism 31 mainly has, as shown in FIGS. 2 to 4, an almost cylindrical lock pin 32 slidably housed or held in a pin housing hole 34 that is formed at and penetrates the wider vane 11 in an axial direction and limiting the relative movement between the vane rotor 10 and the housing 20 by engaging with an engaging hole 35 that is provided at an after-mentioned rear plate 27, and a spring 33 provided between the lock pin 32 and the after-mentioned front plate 26 and forcing the lock pin 32 toward the after-mentioned rear plate 27.

More specifically, as shown in FIG. 4, the lock pin 32 has reduced diameter steps toward a top end side of the lock pin 32 and the pin housing hole 34 has reduced diameter steps toward the rear plate 27 side so that a large diameter part 32a located at a base end side of the lock pin 32 is in sliding contact with a large diameter part 34a of the pin housing hole 34 and a small diameter part 32b located at the top end side of the lock pin 32 is in sliding contact with a small diameter part 34b of the pin housing hole 34. The spring 33 is set with the spring 33 compressed in a back pressure chamber 36 defined at the large diameter part 34a of the pin housing hole 34 by the large diameter part 32a of the lock pin 32. The hydraulic pressure in the retard hydraulic chamber Re is introduced into the engaging hole 35 through a communication groove 37 that is formed on an inner side surface (that is an end surface facing to the rear plate 27) of the wider vane 11 by cutting, and the lock pin 32 moves toward or away from the engaging hole 35 according to the hydraulic pressure of the retard hydraulic chamber Re.

Further, a communication groove 38a to connect the pin housing hole 34 and the spring seating portion 18 is formed on an outer side surface (that is an end surface facing to the front plate 26) of the wider vane 11 by cutting. An opening of this communication groove 38a is closed by the front plate 26, then a back pressure escape passage 38 for discharge of the working fluid leaking from a slight gap between an outer peripheral surface of the large diameter part 32a of the lock pin 32 and an inner peripheral surface of the large diameter part 34a of the pin housing hole 34 to the back pressure chamber 36 side is formed.

The housing 20 has, as shown in FIGS. 1 to 3, a housing body 25 that is an almost cylindrical drive rotary member having the plurality of shoes 21 to 24 protruding from an inner peripheral side of the housing body 25, and the front plate 26 and the rear plate 27 covering front and rear openings of the housing body 25 respectively. The housing 20, the front plate 26 and the rear plate 27 are tightened together in an axial direction with four bolts 6 and four nuts 7, then these are fixedly connected together.

In the same manner as the vanes 11 to 14, each of the shoes 21 to 24 is provided, at a top end portion thereof, with a seal member S2 along a thickness direction of the shoe. The retard and advance hydraulic chambers Re and Ad are defined between the shoes 21 to 24 by the seal members S2 being in sliding contact with an outer peripheral surface of the rotor body 15 of the vane rotor 10. Here, the shoes 21 and 24, which are adjacent to the wider vane 11, of the shoes 21 to 24 each have a thick portion 28, 28 at each base end part on one side in a circumferential direction of the shoes 21 and 24. By the fact that the vane 11 contacts or is pressed against the thick portion 28 of the shoe 21 or 24 at a maximum relative rotation of the vane rotor 10 while the retard and advance hydraulic chambers Re and Ad are secured between the vane 11 and the shoe 21 or 24 in the circumferential direction, a further rotation of the vane rotor 10 is limited.

Figure 5A:
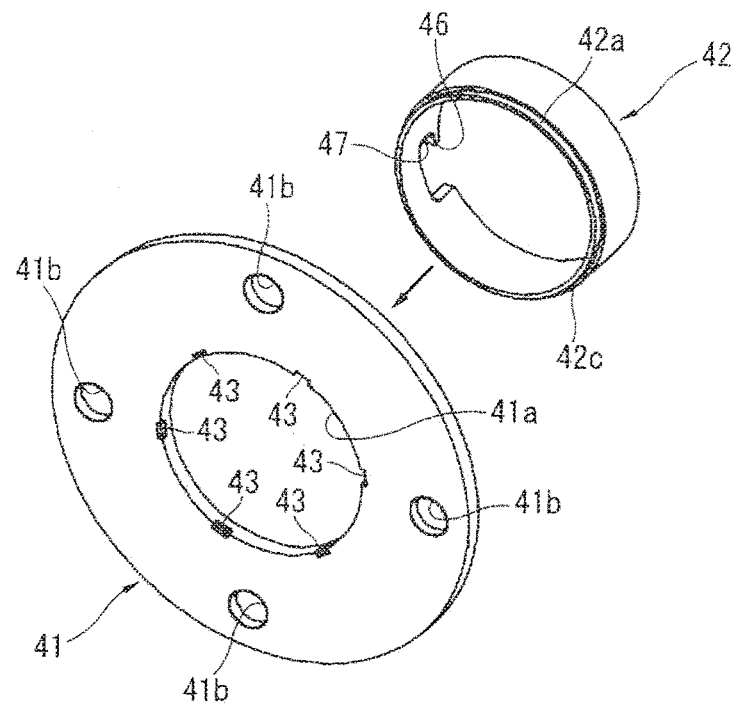
FIGS. 5A and 5B are perspective views of the front plate according to a first embodiment of the present invention.
Figure 5B:
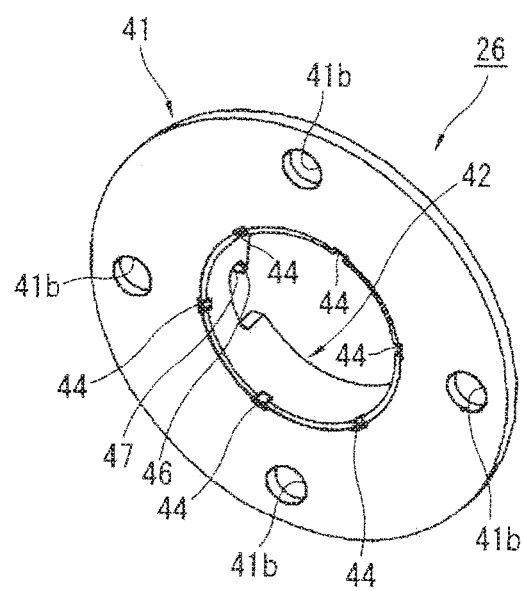

As shown in FIGS. 1, 5A and 5B, the front plate 26 has a relatively thin disk shape. The front plate 26 is formed from a plate member 41 having a fitting hole 41a that is a circular hole penetrating the middle of the plate member 41 and a cylindrical member 42 provided as a separate member from the plate member 41 so as to protrude from an outer end side hole edge of the fitting hole 41a and accommodating and holding therein the spring portion 30c of the torsion spring 30. The cylindrical member 42 is crimped or caulked and fixed to the plate member 41, then the front plate 26 is formed as an integral component.

The plate member 41 is made of thin metal plate by press-molding. A plurality of bolt insertion holes 41b into which the respective bolts 6 are inserted are provided in predetermined circumferential direction positions at an outer circumferential area of the fitting hole 41a. The fitting hole 41a has an outside diameter that is greater than an outside diameter of the spring portion 30c of the torsion spring 30. The fitting hole 41a is provided, in predetermined circumferential direction positions at an inner end side hole edge thereof, with a plurality of stopper grooves 43 (corresponding to key grooves of the present invention) to which after-mentioned stopper portions 44 formed at the cylindrical member 42 are fixed.

Figure 6A:
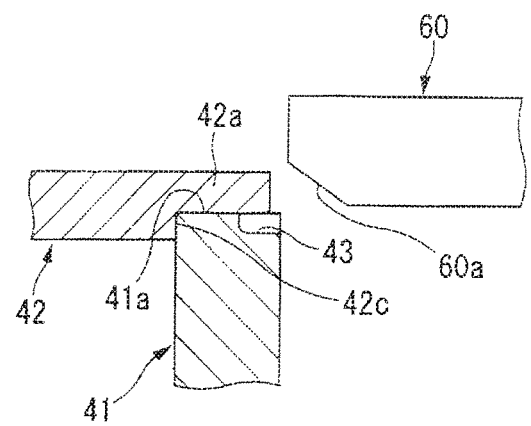
FIGS. 6A and 6B are enlarged longitudinal cross sectional views of a connecting part of the plate member and the cylindrical member shown in FIGS. 5A and 5B.
Figure 6B:
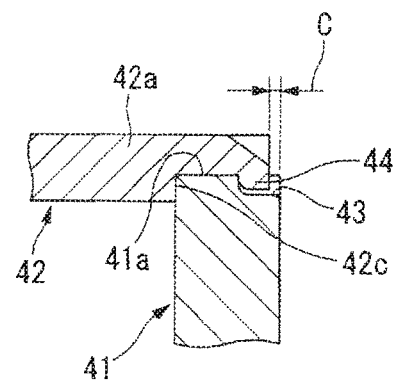
Figure 7A:
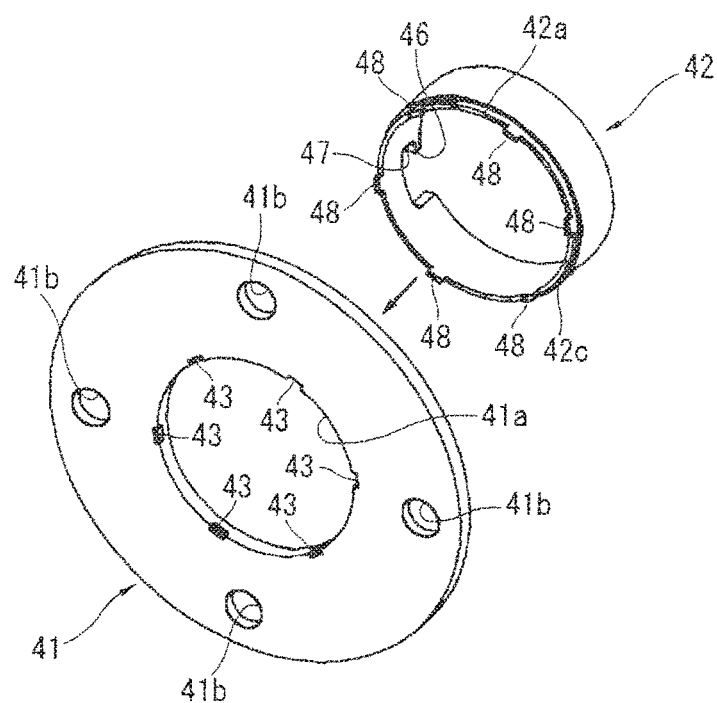
FIGS. 7A and 7B are perspective views of the front plate according to a second embodiment of the present invention.
Figure 7B:
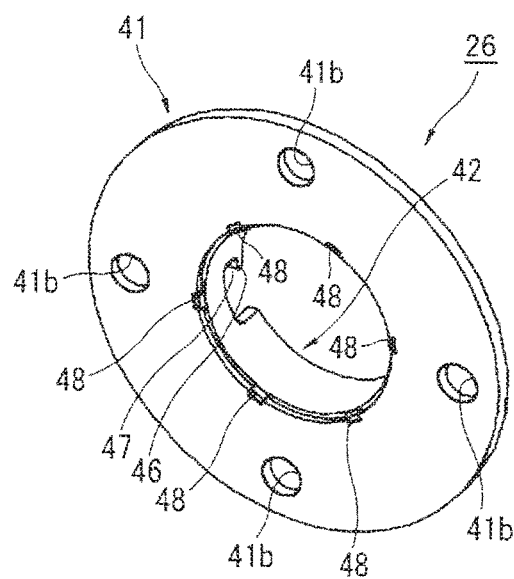

The cylindrical member 42 is formed into a cylindrical shape having a predetermined plate thickness (a thickness width) T2 that is smaller (thinner) than the plate member 41. An inner end part in a predetermined range of the cylindrical member 42 is shaped into reduced diameter steps as a fitting portion 42a that is able to be fitted to the fitting hole 41a. More specifically, as shown in FIGS. 6A and 6B, this fitting portion 42a is formed so that a length of the fitting portion 42a is slightly shorter than a plate thickness T1 of the plate member 41, a top end part of the fitting portion 42a faces the stopper groove 43 and a minute gap C is formed between a top edge of the top end part of the fitting portion 42a and an inner side surface of the plate member 41. In other words, the axial direction gap C is formed between the top edge of the fitting portion 42a and the rotor body 15, which faces the top edge of the fitting portion 42a, of the vane rotor 10 upon assembling of the device.

Then, by an after-mentioned crimping or caulking manner, the cylindrical member 42 is fixed to the plate member 41 so that each of the plurality of stopper portions 44 (corresponding to key forming portion of the present invention) formed at the top end part, facing the stopper groove 43, of the fitting portion 42a is engaged and fixed to the stopper groove 43 in a pressed state. That is, by the top edge of the fitting portion 42a being pressed, a portion (material) of the top end part of the fitting portion 42a is crushed into the stopper groove 43, and the cylindrical member 42 is connected and fixed to the plate member 41.

An inside diameter of the cylindrical member 42 is set to a substantially same diameter as an outside diameter of the spring seating portion 18, then the cylindrical member 42 serves as a spring guide together with the spring seating portion 18, which form a substantially continuous smooth circumferential wall, and also serves as a series of spring accommodating portion 45 that accommodates the spring portion 30c of the torsion spring 30 in an inner circumference side of this spring guide. With this structure, the spring portion 30c of the torsion spring 30 can be accommodated slidably in an axial direction by the spring guide in the spring accommodating portion 45. Further, a smooth deformation of the spring portion 30c can be secured when applying torque to the torsion spring 30.

Further, as shown in FIGS. 3, 5A and 5B, the cylindrical member 42 is provided at an outer end portion thereof with a cutting portion 46 by cutting a part of the cylindrical member 42 in a circumferential direction. Also, by cutting a part of a base end side of the cutting portion 46 in the circumferential direction, a second stopper portion 47 for stopper-fixing of the other end portion 30b of the torsion spring 30 is formed. In this manner, by forming the second stopper portion 47 into a groove shape that opens to the outer end portion of the cylindrical member 42, the torsion spring 30 can be externally set or assembled. As a consequence, during the assembly of the device, it is possible to avoid such a complicated or troublesome assembly that other parts or components are assembled while relatively rotating the housing 20 and the vane rotor 10 against the urging force of the torsion spring 30 after setting the torsion spring 30, then this ensures an improved productivity of the device.

The rear plate 27 has an almost disk shape, as shown in FIG. 1. The rear plate 27 is formed integrally with the sprocket 1 so that the sprocket 1 is places at an outer circumferential portion of the rear plate 27. At the middle of this rear plate 27, an insertion hole 27a into which the camshaft 2 is inserted is formed. Further, at an outer circumferential area of the insertion hole 27a, a plurality bolt insertion holes 27b into which the respective bolts 6 are inserted are provided. Moreover, at an outer side surface of the rear plate 27, a recessed portion 27c that accommodates therein the nuts 7 screwed on the bolts 6 for tightening and connecting the components 25, 26 and 27 is provided.

In addition, at an inner side surface of the rear plate 27, the engaging hole 35 that restrains the rotation of the vane rotor 10 by engaging with the lock pin 32 when the vane rotor 10 is positioned in a most-advanced angle position is provided. That is, as shown in FIG. 4, this engaging hole 35 has reduced diameter steps so that a frontward first hole portion 35a has a larger diameter than an outside diameter of the top end portion of the lock pin 32 and a rearward second hole portion 35b has a smaller diameter than the outside diameter of the top end portion of the lock pin 32. Then, as previously described above, by the fact that the lock pin 32 is engaged with the first hole portion 35a when a phase of the vane rotor 10 is in a most-advanced angle state, the relative rotation of the vane rotor 10 with respect to the housing 20 is restrained.

The hydraulic pressure supply and exhaust unit 4 is a unit that selectively supplies and exhausts the hydraulic pressure or the working fluid to or from the retard hydraulic chamber Re or the advance hydraulic chamber Ad, as shown in FIG. 1. The hydraulic pressure supply and exhaust unit 4 mainly has the retard side oil passage 51 connected to each retard side communication groove 16a, the advance side oil passage 52 connected to each advance side communication groove 16b, an oil pump 53 that is a hydraulic pressure source supplying the hydraulic pressure to one of the oil passages 51 and 52 through a well-known electromagnetic valve 55 and an oil drain passage 54 connected to the other, which is not connected to the oil pump 53, of the oil passages 51 and 52 through the electromagnetic valve 55. Here, the electromagnetic valve 55 is a two-way switching valve, and performs switching control of connection between the oil passages 51 and 52, the oil pump 53 and the oil drain passage 54 by a control signal from an electrical control unit (ECU) (not shown).

In the following description, a manufacturing process of the front plate 26 that has a distinctive structure, of the valve timing control device of the internal combustion engine according to the present invention will be explained with reference to FIGS. 5A, 5B, 6A and 6B.

First, by pressing a metal plate, the plate member 41 is molded. Here, the fitting hole 41a, each stopper groove 43 and each bolt insertion hole 41b are formed by this molding. Further, in parallel with this molding of the plate member 41, the cylindrical member 42 is manufactured. More specifically, by cutting a metallic conduit to a predetermined length and machining this cut metallic conduit, the fitting portion 42a and the second stopper portion 47 are formed.

Next, the plate member 41 and the cylindrical member 42, which are manufactured by different process as described above, are connected and fixed together by crimping or caulking. That is, the fitting portion 42a of the cylindrical member 42 is inserted into the fitting hole 41a of the plate member 41 from an outer side surface side of the plate member 41 until a step portion 42c of the cylindrical member 42 contacts the outer end side hole edge of the fitting hole 41a, and fitted to the fitting hole 41a. Subsequently, each inner circumferential side end edge of the fitting portion 42a, which corresponds to the stopper groove 43, is crimped or caulked so as to be crushed by a tapered part of a punch 60 in a state in which positioning (phase fitting) in a rotation direction of the both members 41 and 42 is made by each bolt insertion hole 41b and the second stopper portion 47 through an assembly jig (not shown).

Then, a part of this crimped or caulked portion (material) of the fitting portion 42a shifts and is deformed to an outer circumferential side, and thus each stopper portion 44 is formed. The stopper portion 44 is pressed into the stopper groove 43 and engaged with and fixed to the stopper groove 43 in a pressed state, thereby connecting and fixing the plate member 41 and the cylindrical member 42 together. The front plate 26 is completed in this way.

As explained above, according to the present invention, since the front plate 26 is formed by two members (two pieces) of the plate member 41 and the cylindrical member 42, a proper thickness width can be set for each of the members 41 and 42. That is, regarding the cylindrical member 42 that does not need more plate thickness than the plate member 41, since a thickness of the cylindrical member 42 can be set to be thinner than the plate member 41, unnecessary increase in weight of the device can be suppressed, it is therefore possible to sufficiently lighten weight of the device.

Further, by employing a two-piece structure, as compared with a conventional one-piece structure, a machining process such as a drawing or spinning process can be omitted, and each of the members 41 and 42 can be readily manufactured with high accuracy. As a result, in particular, regarding the plate member 41 of which high precision is required due to a relationship of a clearance with the vane rotor 10, the precision can be improved without cost increase caused by increase in the number of times the plate member 41 is pressed and by increase in precision of a mold for the plate member 41.

Moreover, in a crimping structure, since the minute gap C is provided between the top edge of the top end part of the fitting portion 42a and the inner side surface of the plate member 41, the oil can be kept by and in the minute gap C. Consequently, when the torsion spring 30 forces the vane rotor 10 to the advanced angle side against the alternating torque in the state immediately before the engine stop in which no hydraulic pressure is applied to both of the retard hydraulic chamber Re and the advance hydraulic chamber Ad, i.e. when friction of the spring portion 30c itself of the torsion spring 30 and friction between the spring portion 30c and an inner circumferential surface of the cylindrical member 42 are generated, lubrication can be made by the oil kept in the minute gap C, then durability of the device can be improved.

Furthermore, by forming the second stopper portion 47 for stopper-fixing of the other end portion 30b of the torsion spring 30, as compared with a case where the second stopper portion 47 is provided as a separate element, parts count can be reduced. Productivity can be increased and also cost reduction is achieved.

Second Embodiment

FIGS. 7A, 7B, 8A and 8B show a second embodiment of the valve timing control device of the internal combustion engine of the present invention. In the second embodiment, the crimping (connecting) structure of the plate member 41 and the cylindrical member 42 of the first embodiment is changed. Here, since a basic structure or configuration of the valve timing control device in this embodiment is same as that of the first embodiment, the same element or component as that of the first embodiment is indicated by the same reference sign, and its detailed explanation will be omitted.

In this embodiment, a plurality of nail portions 48 that are able to be engaged with and fixed to the respective stopper grooves 43 are provided in and protrude from predetermined circumferential direction positions at the top end part of the fitting portion 42a of the cylindrical member 42, which corresponding to the stopper grooves 43 of the plate member 41. These nail portions 48 are bent and engaged with and fixed to the respective stopper grooves 43, then the cylindrical member 42 is connected to the plate member 41.

The manufacturing process of the front plate 26 is basically same as that of the first embodiment, namely, that after manufacturing the plate member 41 and the cylindrical member 42 separately, both of the members 41 and 42 are connected and fixed together by crimping or caulking. Especially in this embodiment, by crimping a top end side of the nail portion 48 protruding from the fitting portion 42a of the cylindrical member 42 so that the top end side of the nail portion 48 is crushed, the nail portion 48 is engaged with and fixed to the stopper groove 43 in a pressed state, thereby connecting and fixing the plate member 41 and the cylindrical member 42 together. The front plate 26 is completed in this way.

In view of the foregoing, the present embodiment is different from the first embodiment in only the connecting manner of the plate member 41 and the cylindrical member 42, but has the same effect as the first embodiment. Especially in the present embodiment, since the connection of the both members 41 and 42 is completed only by pressing and bending the top end side of the nail portion 48 from an axial direction, as compared with the first embodiment, the crimping can be relatively easily done.

Third Embodiment

Figure 9A:
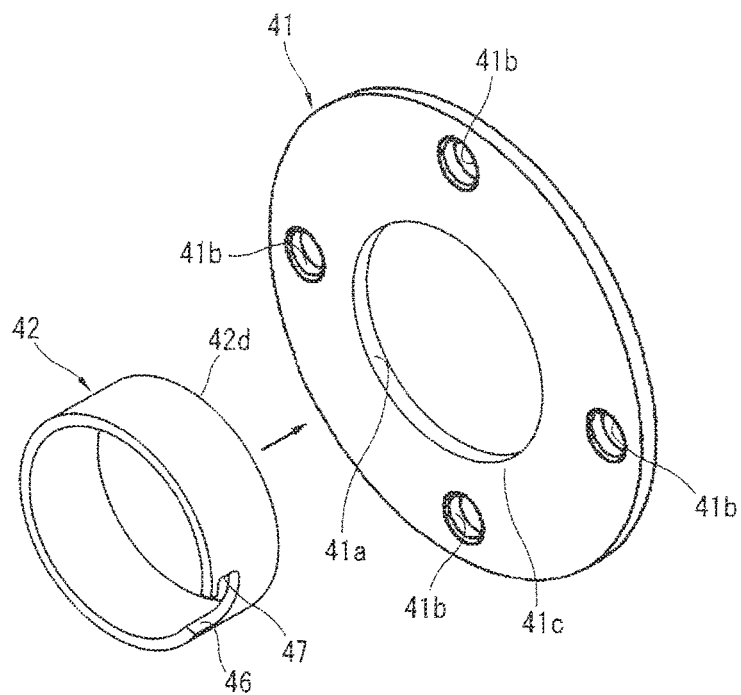
FIGS. 9A and 9B are perspective views of the front plate according to a third embodiment of the present invention.
Figure 9B:
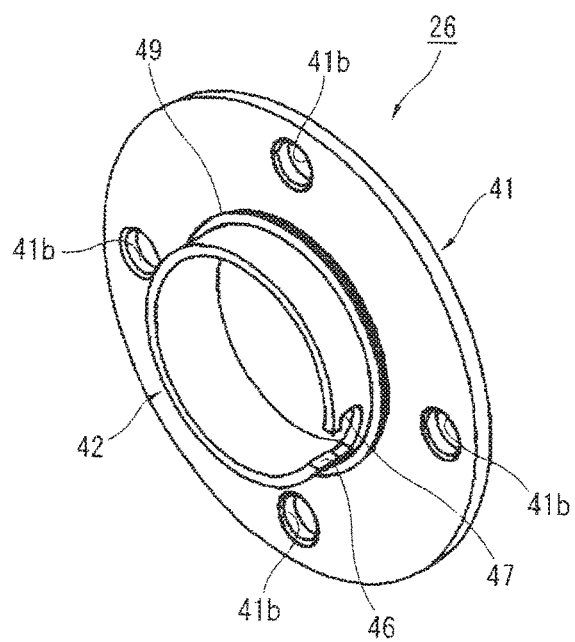

FIGS. 9A and 9B show a third embodiment of the valve timing control device of the internal combustion engine of the present invention. In the third embodiment, the crimping (connecting) structure of the plate member 41 and the cylindrical member 42 of the first embodiment is changed. Here, since a basic structure or configuration of the valve timing control device in this embodiment is same as that of the first embodiment, the same element or component as that of the first embodiment is indicated by the same reference sign, and its detailed explanation will be omitted.

In this embodiment, an inner end surface 42d of the cylindrical member 42 is formed so as to be fitted to a hole edge 41c of the fitting hole 41a of the plate member 41, and the hole edge 41c and the inner end surface 42d are joined by friction welding. In the drawing, a reference sign 49 indicates a curl portion formed by the friction welding.

The manufacturing process of the front plate 26 is basically same as that of the first embodiment, namely, that after manufacturing the plate member 41 and the cylindrical member 42 separately, the both members 41 and 42 are set in a friction welding device and joined together as described above.

In view of the foregoing, the present embodiment is different from the first embodiment in only the fixing manner of the plate member 41 and the cylindrical member 42, but has the same effect as the first embodiment. Especially in the present embodiment, since whole of the inner end surface 42d of the cylindrical member 42 is joined to the hole edge 41c of the fitting hole 41a of the plate member 41, as compared with the first embodiment, the both members 41 and 42 can be firmly fixed.

The present invention is not limited to the above embodiments. For instance, a structure or configuration of the housing 20, the vane rotor 10 and the hydraulic pressure supply and exhaust unit 4, which have no connection with the feature of the present invention, and the fixing manner fixing the plate member 41 and the cylindrical member 42, which has a connection with the feature of the present invention, could be modified and changed according to specifications of the internal combustion engine and cost, as long as the effect of the present invention can be obtained.

Figure 10:
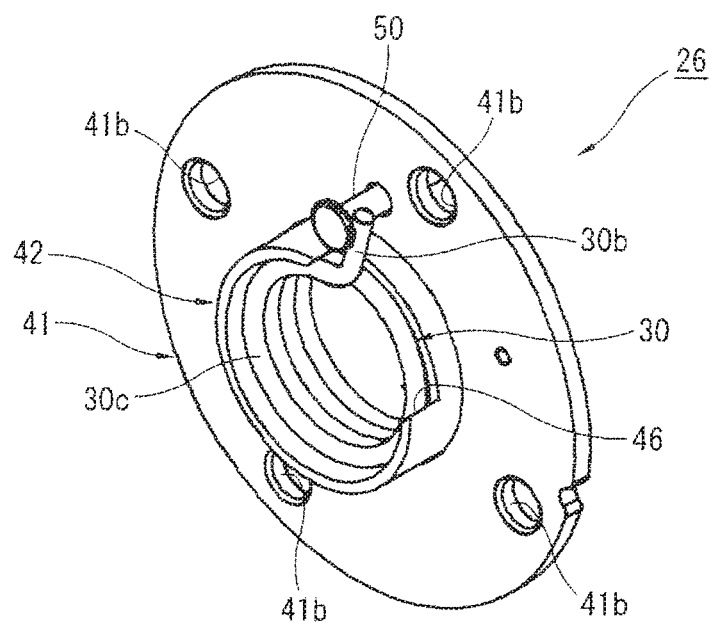
FIG. 10 is a perspective view showing other stopping state of a torsion spring to the front plate.

Further, the above embodiments show, as an example, that the second stopper portion 47 with which the other end portion 30b of the torsion spring 30 is engaged is formed integrally with the cylindrical member 42. However, an engaging structure is not limited to this. For instance, as shown in FIG. 10, a stopper pin 50 is provided as a separate element from the plate member 41, and the other end portion 30b of the torsion spring 30 is engaged with and fixed by the stopper pin 50. In this case, it is possible to set the thickness width of the cylindrical member 42 irrespective of the urging force (torque) of the torsion spring 30. Increase in flexibility in setting of the thickness width consequently contributes to further weight reduction of the device.

Technical ideas that can be understood from the embodiment described above, except contents recited in scope of claim for patent, will be explained below.

(a) In the valve timing control device of the internal combustion engine, the one end of the torsion coil spring is engaged with the cylindrical member.

Since the cylindrical member also serves as a stopper portion of the torsion coil spring in this manner, there is no need to provide an additional stopper portion of the torsion coil spring, productivity can be increased and also cost reduction is achieved by reduction of parts count.

(b) In the valve timing control device of the internal combustion engine, the one end of the torsion coil spring is engaged with the plate member.

With this structure, the plate member and the cylindrical member can be firmly fixed, then durability of the device can be improved.

(c) In the valve timing control device of the internal combustion engine, the key forming portion is formed by being crimped by a punch having a tapered shape.

(d) In the valve timing control device of the internal combustion engine as according to (c) as described above, the plate member is formed by press-molding.

(e) In the valve timing control device of the internal combustion engine according to (c) as described above, the cylindrical member is formed by cutting a metallic conduit to a predetermined length and machining the cut metallic conduit.

(f) In the valve timing control device of the internal combustion engine, a predetermined minute gap C is provided between a top end of the nail portion after being bended and deformed and an inner side surface of the plate member.

(g) In the valve timing control device of the internal combustion engine according to (f) as described above, a plurality of nail portions are provided.

(h) In the valve timing control device of the internal combustion engine according to (g) as described above, the nail portion and a key groove formed at an inner end edge of the circular hole are arranged as a pair at the inner end edge of the circular hole of the plate member.

(i) In the fastening structure, a base end portion of the key forming portion is formed so as to be a stepped portion, and the stepped portion contacts an outer end side hole edge of the penetration hole.

(j) In the fastening structure according to (i) as described above, a predetermined minute gap C is provided between a top end of the key forming portion after being press-deformed and an inner side surface of the first member.

EXPLANATION OF REFERENCE

10 . . . vane rotor (driven rotary member)
11·14 . . . vane
25 . . . housing (drive rotary member)
21~24 . . . shoe
25 . . . housing body
26 . . . front plate
30 . . . torsion spring (torsion coil spring)
41 . . . plate member
41a . . . fitting hole (circular hole)
42 . . . cylindrical member
43 . . . stopper groove (key groove)
44 . . . stopper portion (key forming portion)
Ad . . . advance hydraulic chamber (advance working chamber)
Re . . . retard hydraulic chamber (retard working chamber)

The invention claimed is:

1. A valve timing control device of an internal combustion engine comprising:
a drive rotary member to which a turning force is transmitted from an engine crankshaft;
a driven rotary member rotatably provided relative to the drive rotary member within a predetermined angle range; and
a front plate with which one end of a torsion coil spring that forces the driven rotary member to one side of a rotation direction is engaged, and wherein the front plate has:
a plate member provided so as to cover one end of the drive rotary member and having a circular hole penetrating a middle of the plate member; and
a cylindrical member provided so as to protrude from an outer side surface of the plate member and fixed to the plate member,
wherein a key groove is formed at an inner end edge of the circular hole of the plate member, and
wherein the cylindrical member is connected and fixed to the plate member by inserting and fitting one end portion of the cylindrical member to the circular hole of the plate member from an outer end side of the circular hole and press-deforming a key forming portion that is formed at an end edge of the one end portion of the cylindrical member so that the key forming portion is engaged with the key groove of the plate member.

2. The valve timing control device of the internal combustion engine as claimed in claim 1, wherein:
a base end portion of the key forming portion is formed so as to be a stepped portion, and
the stepped portion contacts an outer end side hole edge of the circular hole.

3. The valve timing control device of the internal combustion engine as claimed in claim 2, wherein:
a predetermined minute gap C is provided between a top end of the key forming portion after being press-deformed and an inner side surface of the plate member.

4. The valve timing control device of the internal combustion engine as claimed in claim 3, wherein:
the key forming portion is formed by being crimped by a punch having a tapered shape.

5. The valve timing control device of the internal combustion engine as claimed in claim 4, wherein:
the plate member is formed by press-molding.

6. The valve timing control device of the internal combustion engine as claimed in claim 4, wherein:
the cylindrical member is formed by cutting a metallic conduit to a predetermined length and machining the cut metallic conduit.

7. The valve timing control device of the internal combustion engine as claimed in claim 3, wherein:
a plurality of key grooves and a plurality of key forming portions corresponding to the plurality of key grooves are provided.

8. The valve timing control device of the internal combustion engine as claimed in claim 7, wherein:
the key groove and the key forming portion corresponding to the key groove are arranged as a pair at the inner end edge of the circular hole of the plate member.

9. The valve timing control device of the internal combustion engine as claimed in claim 3, wherein:
a thickness width of the cylindrical member is set to be thinner than a thickness width of the plate member.

10. The valve timing control device of the internal combustion engine as claimed in claim 9, wherein:
the one end of the torsion coil spring is engaged with the cylindrical member.

11. The valve timing control device of the internal combustion engine as claimed in claim 9, wherein:
the one end of the torsion coil spring is engaged with the plate member.

12. The valve timing control device of the internal combustion engine as claimed in claim 1, wherein:
the cylindrical member is fixed to the plate member by bending and deforming a plurality of nail portions that are provided at and protrude from one end edge of the cylindrical member.

13. The valve timing control device of the internal combustion engine as claimed in claim 12, wherein:
a predetermined minute gap C is provided between a top end of the nail portion after being bended and deformed and an inner side surface of the plate member.

14. The valve timing control device of the internal combustion engine as claimed in claim 13, wherein:
a plurality of nail portions are provided.

15. The valve timing control device of the internal combustion engine as claimed in claim 14, wherein:
the nail portion and a key groove formed at an inner end edge of the circular hole are arranged as a pair at the inner end edge of the circular hole of the plate member.

16. The valve timing control device of the internal combustion engine as claimed in claim 1, wherein:

the cylindrical member is joined to the plate member by friction welding.

17. A fastening structure comprising:

a first member having a penetration hole in a middle of the first member and a key groove at an inner end edge of the penetration hole; and a second member provided so as to protrude from an outer side surface of the first member and having a key forming portion at a base end portion of the second member, and the second member being connected and fixed to the first member by press-deforming the key forming portion so that the key forming portion is engaged with the key groove of the first member, wherein a predetermined minute gap C is provided between a top end of the key forming portion after being press-deformed and an inner side surface of the first member.

18. The fastening structure as claimed in claim 17, wherein:

a base end portion of the key forming portion is formed so as to be a stepped portion, and the stepped portion contacts an outer end side hole edge of the penetration hole.

\* \* \* \* \*